(12) United States Patent
Ichikawa

(10) Patent No.: US 12,189,594 B2
(45) Date of Patent: Jan. 7, 2025

(54) SECRET HASH TABLE CONSTRUCTION APPARATUS, SECRET HASH TABLE CONSTRUCTION SYSTEM, SECRET HASH TABLE CONSTRUCTION METHOD AND PROGRAM

(71) Applicant: NIPPON TELEGRAPH AND TELEPHONE CORPORATION, Tokyo (JP)

(72) Inventor: Atsunori Ichikawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/255,928

(22) PCT Filed: Dec. 10, 2020

(86) PCT No.: PCT/JP2020/046125
§ 371 (c)(1),
(2) Date: Jun. 5, 2023

(87) PCT Pub. No.: WO2022/123744
PCT Pub. Date: Jun. 16, 2022

(65) Prior Publication Data
US 2024/0028576 A1 Jan. 25, 2024

(51) Int. Cl.
*G06F 16/22* (2019.01)
*G06F 21/60* (2013.01)

(52) U.S. Cl.
CPC ........ *G06F 16/2255* (2019.01); *G06F 21/602* (2013.01)

(58) Field of Classification Search
CPC ...... G06F 16/2255; G06F 21/602; G09C 1/00
See application file for complete search history.

(56) References Cited

U.S. PATENT DOCUMENTS

2005/0240943 A1* 10/2005 Smith .................. G06F 3/00
719/328
2009/0254572 A1* 10/2009 Redlich ................ G06Q 10/10
(Continued)

OTHER PUBLICATIONS

Asharov et al.: "OptORAMa: Optimal Oblivious RAM", Journal of the ACM, vol. 70, No. 1, Article 4. Publication date: Dec. 2022 (Year: 2022).*

(Continued)

*Primary Examiner* — Kuen S Lu
(74) *Attorney, Agent, or Firm* — IPUSA, PLLC

(57) ABSTRACT

A secret hash table construction apparatus constructs a secret hash table capable of storing up to Z items of data in B kinds of address values by secret computation from a real data stream including items of data each having a key and a flag indicating whether or not the data is dummy data. The secret hash table construction apparatus executes generating a first array in which a storage destination data array is connected with another storage destination data array as dummy data; generating a second array in which the real data stream is connected with a dummy data stream; sorting each of the first and second arrays based on a ranking operations; extracting address values of lower ranks to generate a third array; and sorting the second array using a fourth array, and outputting BZ elements in the sorted second array as the secret hash table.

8 Claims, 8 Drawing Sheets

(56) References Cited

U.S. PATENT DOCUMENTS

| | | | | | |
|---|---|---|---|---|---|
| 2014/0304505 | A1* | 10/2014 | Dawson | ............. | G06F 21/6227 713/165 |
| 2019/0147770 | A1* | 5/2019 | Yoshino | ................. | G06F 16/00 713/193 |
| 2023/0039723 | A1* | 2/2023 | Ichikawa | ............. | H04L 9/3236 |

OTHER PUBLICATIONS

Chan et al.: "Perfectly Secure Oblivious Parallel RAM", The University of Hong Kong (Year: 2018).*

Kushilevitz et al.: "Sub-logarithmic Distributed Oblivious RAM with Small Block Size", arXiv.org e-Print archive as arXiv:1802.05145 [cs.CR] (Year: 2018).*

Atsunori Ichikawa et al., "Optimal Secret Hash in 3-Party Computation and Oblivious RAM with Sublogarithmic Efficiency", 2020 Symposium on Cryptography and Information Security (SCIS), Proceedings (2020).

T-H.H.Chan et al., "Oblivious hashing revisited, and applications to asymptotically efficient ORAM and OPRAM", Cryptology ePrint Archive, Report 2017/924, 2017.

K. Chida et al., "High-throughput secure AES computation", In WAHC@CCS 2018, pp. 13-24, 2018.

K. Chida et al., "An efficient secure threeparty sorting protocol with an honest majority", CryptologyePrint Archive, Report 2019/695 (2019), https://eprint.iacr.org/2019/695.

O. Goldreich et al., "Software protection and simulation on oblivious RAMs", J. ACM, 43(3):1-44, Nov. 1993.

M. Ito et al., "Secret sharing schemes realizing general access structures", Proceedings of the IEEE Global Telecommunication Conference, Globecom 87, pp. 99-102, 1987.

A. Shamir, "How to share a secret", Commun. ACM, vol. 22, No. 11, pp. 612-613, 1979.

Naoto Kiribuchi et al., "MEVAL3: A Library for Programmable Secret Computation", Symposium on Cryptography and Information Security (SCIS), 2018.

* cited by examiner

SECRET HASH TABLE CONSTRUCTION APPARATUS, SECRET HASH TABLE CONSTRUCTION SYSTEM, SECRET HASH TABLE CONSTRUCTION METHOD AND PROGRAM

TECHNICAL FIELD

The present invention relates to secret computation and, more particularly, to an operation in which a sequence of an array is concealed.

BACKGROUND ART

A hash table is a data structure for performing high-speed data retrieval based on a key value of data by encoding the key value using a hash function or the like and associating the encoded key value with an address value in a data array. This is useful when, for example, data is deposited on an external server or the like to be retrieved based on a key value as needed.

However, a normal hash table is not expected to conceal data and, for example, there is a problem in that a server entrusted with data (or a hash table) by a user can identify a table structure and thereby observe an access tendency of the user. As an existing method for solving such a problem, there is a secret hash table (for example, refer to References [4 and 1]). Note that names of references are collectively described at the end of the specification. A secret hash table is a technique for making a server construct a hash table while keeping a table structure secret and enables the access tendency of a user to be hidden from the server.

While secret hash table construction methods self-evidently include a method in which a user encrypts all data items at hand, constructs a hash table, and entrusts the hash table to a server, in this case, a storage area of $O(n)$ is required with respect to n as the number of items of data. Reference [4] and Reference [1] described above represent methods of constructing a secret hash table on a server by a coordination protocol between a user and a server on the assumption that the server has all the encrypted data and the methods have an advantage that $O(1)$ suffices as the storage area of the user when the server has all the encrypted data.

However, the techniques according to References [4 and 1] have a problem in that a significantly large amount of communication is required between the user and the server when constructing a secret hash table. In practice, since there is no guarantee that a communication environment or a computation performance of the user is satisfactory, it is desirable that the above-mentioned cost is reduced as much as possible. One method of solving this problem is a technique disclosed in NPL 1. This document shows methods of constructing a secret hash table without requiring communication between a user and a server at all by secret computation using a plurality of servers and, therefore, stable performance can be implemented regardless of a communication environment and a computation performance of a user terminal.

In particular, a secret hash method called "Oblivious Greedy Hashing" among the methods shown in NPL 1 implements a table construction algorithm which, by giving each item of data to be stored two kinds of address values (that is, values indicating at which position of a table the item of data should be stored), each item of data is stored in whichever has more free space between two storage destinations. Accordingly, there is an advantage that the table size can be reduced as compared with other existing methods.

CITATION LIST

Non Patent Literature

[NPL 1] Atsunori Ichikawa, Koki Hamada, Ryo Kikuchi, Dai Ikarashi, "Optimal Secret Hash in 3-Party Computation and Oblivious RAM with Sublogarithmic Efficiency", 2020 Symposium on Cryptography and Information Security (SCIS), Proceedings (2020).

SUMMARY OF INVENTION

Technical Problem

While the Oblivious Greedy Hashing disclosed in NPL 1 has a small table size and advantageously does not require communication between the user and the server unlike the techniques disclosed in References [4 and 1], there is also a disadvantage that an extremely large amount of communication is required for table construction when simply comparing amounts of communication of systems as a whole. Specifically, if n denotes a total number of items of data stored in the table, while $O(n \log^2 n)$ bits of communication is required when constructing a secret hash table by the method according to Reference [4] or [1], Oblivious Greedy Hashing requires $O(Z \times n \log^2 n)$ bits of communication. Here, Z denotes a parameter related to safety of a system and $Z=2 \log^\epsilon n$ is exemplified in NPL 1.

The present invention has been made in consideration of the points described above and an object thereof is to provide a technique for constructing a secret hash table with a smaller table size without increasing an amount of communication.

Solution to Problem

The disclosed technique provides a secret hash table construction apparatus for constructing a secret hash table capable of storing up to a maximum of Z items of data in each of B kinds of address values by secret computation from a real data stream including a plurality of items of data each having a key and a flag indicating whether or not the data is dummy data, the secret hash table construction apparatus including a computing unit which:

generates a first array in which a storage destination data array including a first address value and a second address value, a flag, and a rank for each address value with respect to each item of data of the real data stream is connected with a storage destination data array including a first address value and a second address value, a flag, and a rank for each address value as dummy data;

generates a second array in which the real data stream is connected with a dummy data stream;

sorts each of the first array and the second array based on the first address value and the flag in the first array, performs a ranking operation on a same item of data with respect to the first address value of the sorted first array, and sorts each of the first array and the second array based on the ranking;

sorts each of the first array and the second array based on the second address value and the flag in the first array and performs a ranking operation on a same item of data with respect to the second address value of the sorted first array; extracts an address value of a lower rank among the first address value and the second address value in the first array, and generates a third array including the extracted address value and a flag; and sorts the second array using a fourth array obtained by comparing each element of a rank array computed from an address value in the third array with Z, and outputs BZ items of elements in the sorted second array as the secret hash table.

Advantageous Effects of Invention

According to the disclosed technique, a technique for constructing a secret hash table with a smaller table size without increasing an amount of communication is provided.

DESCRIPTION OF EMBODIMENTS

Hereinafter, an embodiment of the present invention (the present embodiment) will be described with reference to the drawings. The embodiment to be described below is merely exemplary and embodiments to which the present invention is applied are not limited to the following embodiment.

Overview of Embodiment

In the present embodiment, an efficient secret hash table construction method and an operation method for reducing user-server communication cost by using a plurality of servers will be described. Due to a technique according to the present embodiment, by giving each item of data two storage destinations, a table can be constructed only with an amount of inter-server communication of $O(n \log^2 n)$ bits while suppressing a table size to be as small as in the case of Oblivious Greedy Hashing. Hereinafter, a system configuration and processing procedures of the present embodiment will be described.

(System Configuration)

Figure 1:
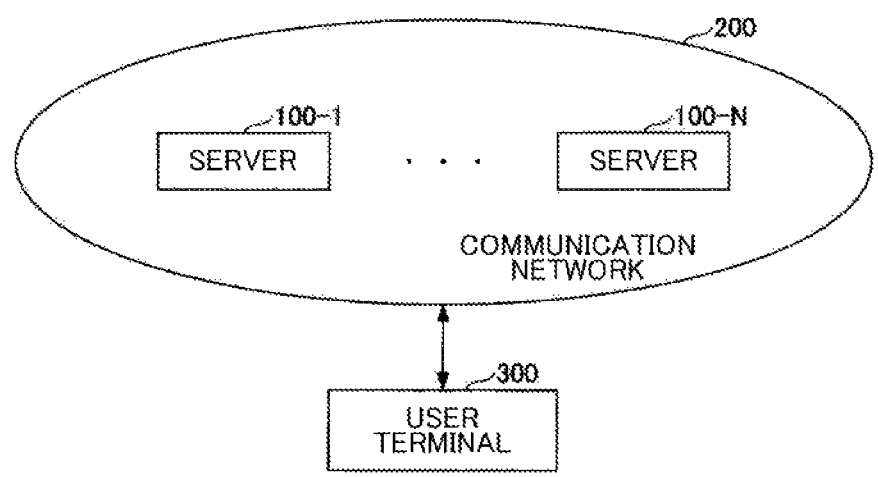
FIG. 1 is a configuration diagram of a secret hash table construction system.

FIG. 1 shows a configuration example of a secret hash table construction system according to the present embodiment. As shown in FIG. 1, the secret hash table construction system according to the present embodiment has a configuration in which a plurality of servers 100-1 to 100-N are provided on a communication network 200. Each server is a computer. The computer may be a physical machine or a virtual machine provided by a cloud.

A user terminal 300 shown in FIG. 1 accesses the secret hash table construction system to acquire data corresponding to, for example, a key.

In the present embodiment, processing related to the construction of a secret hash table is executed by secret computation according to a coordination protocol among the plurality of servers 100-1 to 100-N. However, the use of the coordination protocol among the plurality of servers is simply an example when implementing the present invention and the present invention is not limited thereto. The present invention is also applicable to any technique that enables secret computation to be performed. For example, when secret computation can be performed by one server, the technique according to the present invention can be executed by the server.

Figure 2:
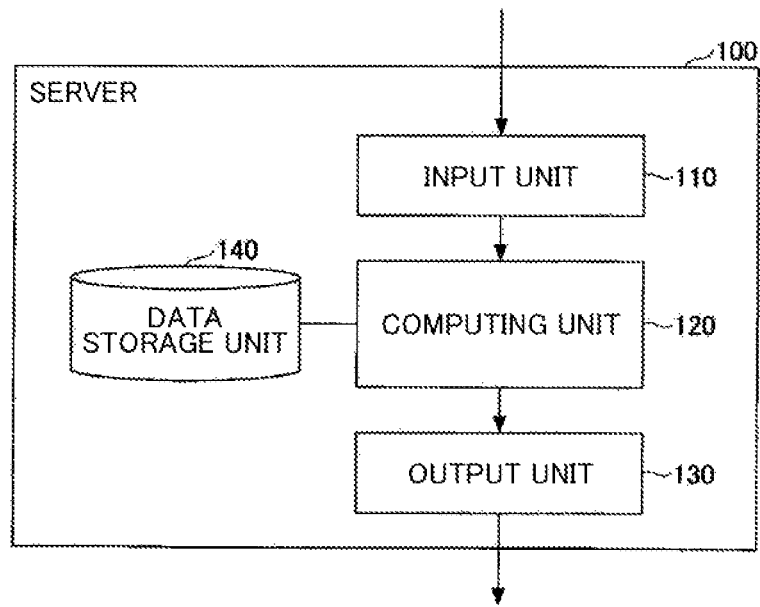
FIG. 2 is a functional configuration diagram of a server.

FIG. 2 shows a configuration example of the server 100. The configuration example of the server 100 shown in FIG. 2 is a configuration in a case where the plurality of servers 100-1 to 100-N are virtually regarded as a single server. In this case, the server 100 shown in FIG. 2 may be called a secret hash table construction system. Alternatively, the server 100 may be called a secret hash table construction apparatus. In addition, when secret computation is to be performed by a single server, the server 100 shown in FIG. 2 may be adopted as the server.

As shown in FIG. 2, the server 100 includes an input unit 110, a computing unit 120, an output unit 130, and a data storage unit 140. The computing unit 120 executes processing related to construction and operation of a secret hash table. The data storage unit 140 stores data prepared in advance for computation, data such as arrays concealed during computation, tables, and the like. For example, the input unit 110 receives and inputs a request from the user terminal 300. For example, the output unit 140 returns a computation result in response to a request from the user terminal 300 to the user terminal 300.

(Hardware Configuration Example)

The server 100 (secret hash table construction apparatus) according to the present embodiment can be implemented by, for example, causing a computer to execute a program describing processing contents described in the present embodiment. Note that the "computer" may be a physical machine or a virtual machine on the cloud. When using a virtual machine, "hardware" as described herein is virtual hardware.

The program described above can be recorded on a computer-readable recording medium (a portable memory or the like) to be stored, distributed, and the like. The program can also be provided through a network such as the Internet or e-mail.

Figure 3:
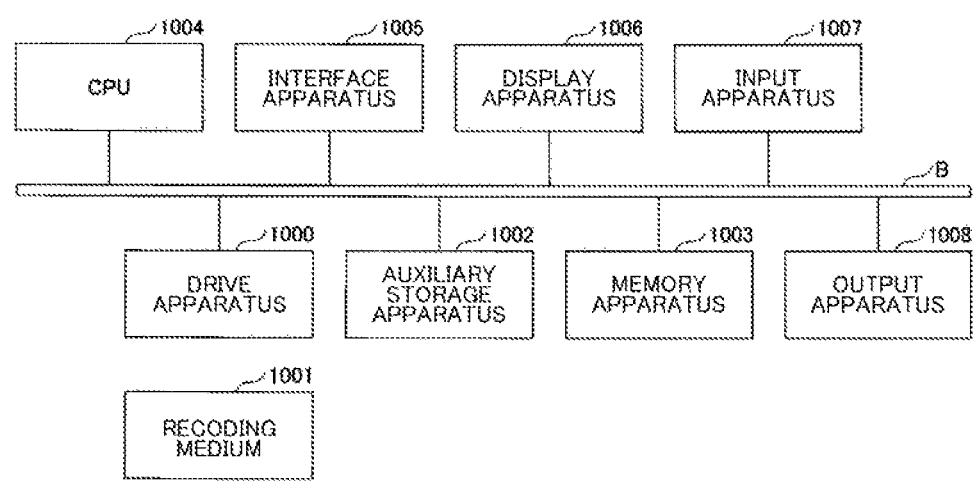
FIG. 3 is a diagram showing a hardware configuration example of an apparatus.

FIG. 3 is a diagram showing a hardware configuration example of the computer. The computer in FIG. 3 includes a drive apparatus 1000, an auxiliary storage apparatus 1002, a memory apparatus 1003, a CPU 1004, an interface apparatus 1005, a display apparatus 1006, an input apparatus 1007, and an output apparatus 1008 which are connected to each other via a bus B.

A program for implementing processing in the computer is provided by, for example, a recording medium 1001 such as a CD-ROM or a memory card. When the recording medium 1001 storing the program is set in the drive apparatus 1000, the program is installed in the auxiliary storage apparatus 1002 from the recording medium 1001 via the drive apparatus 1000. However, the program does not necessarily have to be installed from the recording medium 1001, and may be downloaded from another computer via a network. The auxiliary storage apparatus 1002 stores the installed program and also stores necessary files, data, and the like.

The memory apparatus 1003 reads and stores the program from the auxiliary storage apparatus 1002 when an instruction to start the program is given. The CPU 1004 implements the functions related to the server 100 in accordance with the program stored in the memory apparatus 1003. The interface apparatus 1005 is used as an interface to connect to a network. The display apparatus 1006 displays a GUI (Graphical User Interface) and the like according to the program. The input apparatus 1007 is constituted with a keyboard and a mouse, a button, a touch panel, or the like and is used to input various operation instructions. The output apparatus 1008 outputs a computation result.

(Basic Processing Related to Secret Computation)

First, basic processing steps related to secret computation, as a premise in processing steps of the construction and operation of a secret hash table executed by the computing unit 120 of the server 100, will be described. The basic processing steps themselves are existing techniques.

<Concealment/Restoration>

Hereinafter, a secret value of a value x will be expressed as $[[x]]$, processing $x \rightarrow [[x]]$ will be referred to as concealment of x, and processing $[[x]] \rightarrow x$ will be referred to as restoration of x. Although the present embodiment assumes that a secret sharing method (References [6 and 5]) is to be used as a technique for performing the concealment/restoration processing, any technique of concealment/restoration processing may be used as long as equivalent functionality and safety are provided.

<Basic Operations>

Addition, subtraction, and multiplication of secret values are expressed, respectively, as follows.

$$[[a+b]] \leftarrow [[a]]+[[b]]$$

$$[[a-b]] \leftarrow [[a]]-[[b]]$$

$$[[a \times b]] \leftarrow [[a]] \times [[b]]$$

If a and b are in a space represented by len bits, the technique according to Reference [7] enables addition and subtraction to be executed at a communication cost of 0 and multiplication to be executed at a communication cost of O(len) bits.

<Comparison>

Comparisons between secret values are expressed as follows.

$$[[c]] \leftarrow [[[a]]=_?[[b]]]$$

The above comparison indicates that a result of a determination as to whether a and b are equal is c (a 1-bit number). c is 1 when the determination is correct and 0 when the determination is not correct.

$$[[d]] \leftarrow [[[a]] \leq_? [[b]]]$$

The above comparison indicates that a result of a determination as to whether or not a is equal to or less than b is d (a 1-bit number). d is 1 when the determination is correct and 0 when the determination is not correct.

If a and b are in a space represented by len bits, the technique according to Reference [7] enables an operation of comparison to be executed at a communication cost of O(len) bits.

<Inner Product>

An inner product of vectors or arrays $[[a]]=([[a_0]], \ldots, [[a_{n-1}]])$, $[[b]]=([[b_0]], \ldots, [[b_{n-1}]])$ of a secret value is expressed as follows:

$$[[c]] \leftarrow <[[a]],[[b]]>$$

If each element of vectors a, b is in a space represented by len bits, the technique according to Reference [7] enables an inner product to be executed at a communication cost of O(len) bits.

<Shuffling of Array>

Processing for shuffling a secret array $[[A]]$ is expressed as follows.

$$[[A']] \leftarrow \text{Shuffle}([[A]])$$

When A is an array including n items of len-bit elements, the technique according to Reference [3] enables the processing to be executed at a communication cost of O(len·n) bits.

<Stable Sort>

With respect to a secret key array $[[K]]$ and an array to be sorted $[[A]]$, processing of sorting $[[A]]$ based on each value of $[[K]]$ is expressed as follows.

$$[[A']] \leftarrow \text{Sort}([[K]],[[A]])$$

This processing can be performed in both ascending order and descending order with respect to K. When K is an array including n items of len-bit elements and A is an array including n items of m-bit elements, the technique according to Reference [3] enables the processing to be executed at a communication cost of O(len·n log n+mn) bits.

<Ranking of Same Data>

Let an array $[[A]]=([[a_0]], \ldots, [[a_{n-1}]])$ denote an array of sorted arrays. In this case, a ranking operation with respect to same data is expressed as follows.

$$[[B]] \leftarrow \text{Rank}([[A]]),$$

where $[[B]]=([[b_0]], \ldots, [[b_{n-1}]])$ and each bi satisfies the following:

$b_0=1$

For all $i \in \{1, \ldots, n-1\}$, if $a_{i-1} \neq a_i$, then $b_i=1$

For all $i \in (1, \ldots, n-1)$, if $a_{i-1}=a_i$, then $b_i=b_{i-1}+1$

Specifically, for example, when A=(0, 0, 0, 0, 1, 1, 2, 2, 2), B=(1, 2, 3, 4, 1, 2, 1, 2, 3) is satisfied. Using Range Prefix Sum disclosed in Reference [1] enables the operation to be executed at a communication cost of O(n log n).

<Pseudo-Random Function>

Let values a, s denote an input and a private key of a pseudo-random function, respectively. With respect to secret values $[[a]]$, $[[s]]$, an operation of computing a secret pseudo-random value is expressed as follows.

$$[[r]] \leftarrow \text{PRF}([[a]],[[s]])$$

If the bit length of a is len, then the secret computation processing can be implemented using the technique according to Reference [2] at a communication cost of O(len).

<Encryption by Secret Computation>

Let values a, s denote a plain text and a private key of a block cipher, respectively. With respect to secret values $[[a]]$, $[[s]]$, an operation for generating a cipher text by secret computation is expressed as follows.

$$[[c]] \leftarrow \text{Enc}([[a]],[[s]])$$

If the bit length of a is len, then the secret computation processing can be implemented using the technique according to Reference [2] at a communication cost of O(len).

Hereinafter, specific examples of processing executed by the server 100 according to the present embodiment will be described using first to fifth examples. The following processing is executed by the computing unit 120 of the server 100. In addition, data to be prepared in advance, arrays obtained by computation, tables and the like are stored in the data storage unit 140. The computing unit 120 advances processing by repetitively computing data read from the data storage unit 140 and storing a computation result in the data storage unit 140.

The processing in each example described below is simply an example. For example, the meanings of 1 and 0, ascending order/descending order, and the like may be reversed relative to those in the following examples.

First Example

First, a first example will be described. In the present first example, a method will be described by which the server 100 constructs a secret hash table using data $a_i=(k_i, e_i)$ made up of a key $k_i$ and a flag $e_i$ stored in the data storage unit 140. The key $k_i$ is an identifier unique to each item of data and is used for the purpose of uniquely specifying data when accessing the data or the like.

The flag $e_i$ is a 1-bit value for determining whether or not the data is dummy data and, in this case, the data is regarded as actual data when $e_i=0$ but regarded as dummy data when $e_i=1$.

When a total number of items of data is denoted by n, while a minimum bit length of $k_i$ is expressed as ceil(log n), there may be redundancy. In addition to the key and the flag, each item of data may be given arbitrary information vi, in which case $a_i$ may be expressed as $a_i=(k_i, e_i, v_i)$.

As a premise, the server 100 is assumed to store, in the data storage unit 140, a concealed data stream $[[A]]=([[a_0]], \ldots, [[a_{n-1}]]); [[a_i]]=([[k_i]], [[e_i]])$.

In addition, while the following description assumes that a private key $[[s_0]], [[s_1]]$ concealed in advance is generated and stored in the data storage unit 140, the private key may be generated when necessary during a protocol.

It is assumed that the secret hash table constructed in the present first example is a data array with a size of B×Z and that, and in another expression, it is assumed that the secret hash table is a data structure capable of storing up to a maximum of Z items of data in each of B kinds of address values. In addition, a pseudo-random function used in the present first example is assumed to satisfy $PRF=([[k]], [[s]]) \in \{0, \ldots, B-1\}$.

Figure 4:
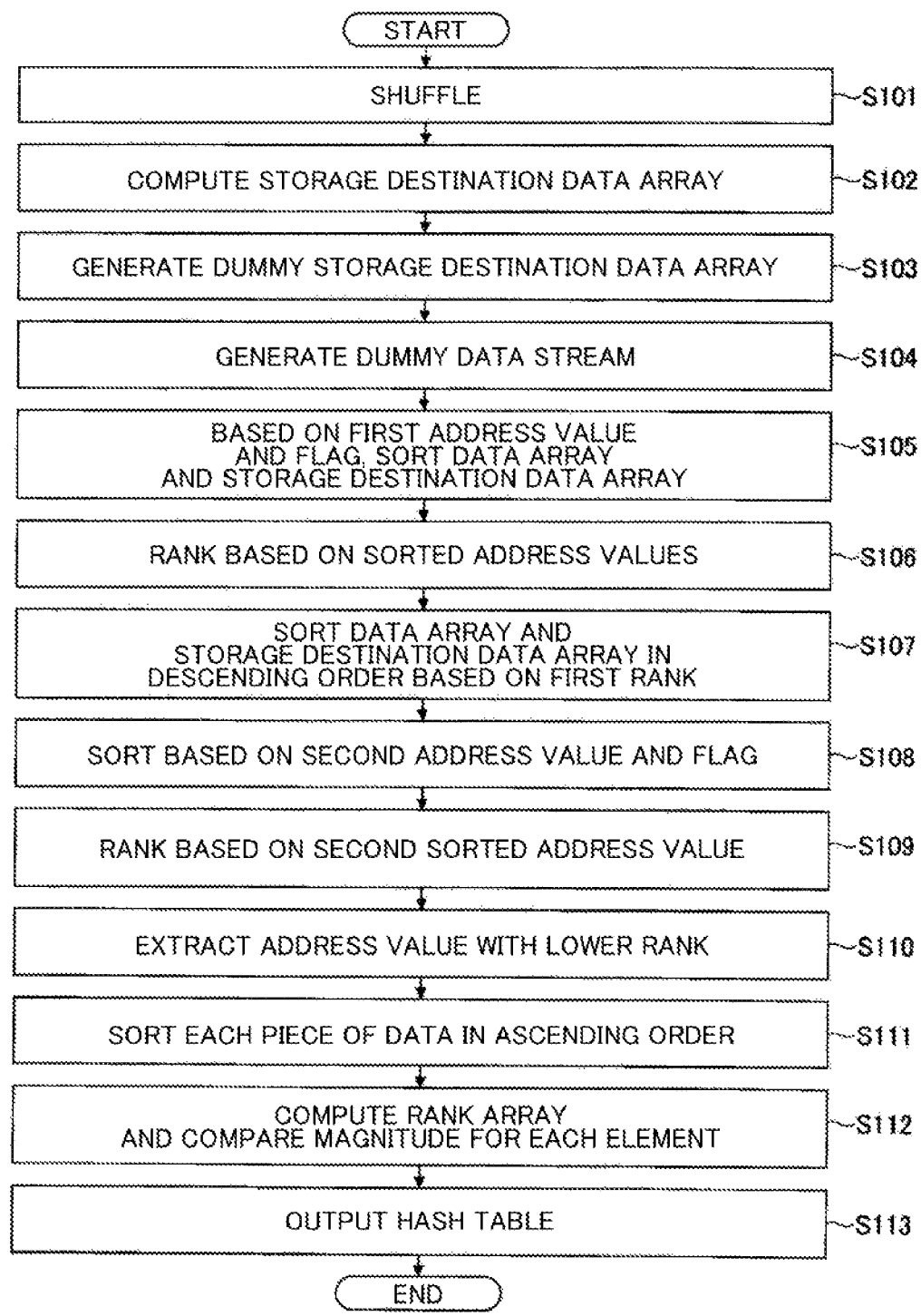
FIG. 4 is a flowchart showing a processing procedure according to a first example.

Under the premises described above, the server 100 constructs a secret hash table by processing described below. The processing executed by the server 100 will be described following procedures shown in the flowchart of FIG. 4.

<S101 (step 101)>

In S101, the server 100 performs shuffling with respect to $[[A]]$ so that $[[A]]$ Shuffle $([[A]])$. However, this operation does not need to be executed depending on a state of $[[A]]$ to be an input and safety to be satisfied.

<S102>

In S102, with respect to $[[A]]$, the server 100 computes a storage destination data array $[[ADDR]]=(([[addr^0_0]], [[addr^1_0]], [[e_0]], ([[rank^0_0]], [[rank^1_0]]), \ldots, ([[addr^0_{n-1}]], [[addr^1_{n-1}]], [[e_{n-1}]], [[rank^0_{n-1}]], [[rank^1_{n-1}]]))$.

However, it is assumed that $[[addr^p_i]] \leftarrow PRF ([[k_i]], [[s_p]]); i \in (0, \ldots, n-1), p \in [0, 1]$ and initialization is performed such that $[[rank^p_i]] \leftarrow [[0]]$. In this case, $addr^0_i$ and $addr^1_i$ respectively correspond to the two kinds of address values corresponding to an i-th item of data $a_i=(k_i, e_i)$ of A, and $rank^p_i$ denotes a rank holding area used when ranking is to be performed later.

For the sake of convenience of describing an image of data, if describing without using the concealment symbol [[ ]], ADDR at this point is an array (an array of n items of items of data) such as ADDR=((3, 1, 0, 0, 0), (18, 95, 0, 0, 0), \ldots, (8, 78, 0, 0, 0)). Hereinafter, descriptions may be given without [[ ]] when appropriate.

<S103>

In S103, the server 100 generates a dummy storage destination data array $[[ADDR_d]]=([[d_0]], \ldots, [[d_{BZ-1}]]); d_i=(floor(i/Z), floor(i/Z), 1, 0, 0)$.

This is an array in which two kinds of address values $addr^0_i$ and $addr^1_i$ hold Z items of dummy storage destination data indicating a same value floor(i/Z)∈{0, \ldots, B−1} for each address value 0, \ldots, B−1.

The server 100 connects the dummy $[[ADDR_d]]$ to an end of a storage destination data array $[[ADDR]]$ related to real data to obtain an array $[[ADDR']]=[[ADDR]]||[[ADDR_d]]$ with a length of n+BZ.

ADDR' at this point is an array (an array of n+BZ items of data) such as ADDR'=((3, 1, 0, 0, 0), (18, 95, 0, 0, 0), \ldots, (8, 78, 0, 0, 0), (0, 0, 1, 0, 0), (0, 0, 1, 0, 0), \ldots, (8, 8, 1, 0, 0)).

In the following description, with respect to the storage destination data array $[[ADDR']]$, a notation $[[ADDR' \cdot addr_0]]$ is defined as an array $([[addr^0_0]], \ldots, [[addr^0_{n+BZ-1}]])$ created by extracting only a first address value $[[addr^0_i]]$ from $[[ADDR']]$. Similarly, notations $[[ADDR' \cdot addr_1]], [[ADDR' \cdot rank_0]],$ and $[[ADDR' \cdot rank_1]]$ are defined as arrays created by respectively extracting $[[addr^1_i]], [[rank^0_i]],$ and $[[rank^1_i]]$ from $[[ADDR']]$.

Furthermore, notations $[[ADDR' \cdot pos_0]]$ and $[[ADDR' \cdot pos_1]]$ denote arrays obtained by respectively extracting a pair $([[addr^0_i]], [[e_i]])$ and a pair $([[addr^1_i]], [[e_i]])$ from $[[ADDR']]$.

For example, if ADDR'=((3, 1, 0, 0, 0), (18, 95, 0, 0, 0), (8, 78, 0, 0, 0), (0, 0, 1, 0, 0), (0, 0, 1, 0, 0), \ldots, (8, 8, 1, 0, 0)), then ADDR'·pos_0=((3, 0), (18, 0), \ldots, (8, 0), (0, 1), (0, 1), \ldots, (8, 1)).

<S104>

In S104, the server 100 generates a dummy data stream $[[A_d]]=([[a^d_0]], \ldots, [[a^d_{BZ-1}]]); a^d_i=(dummy, 1)$, where "dummy" takes a value that differs from any of predetermined keys $k_i$. $[[A_d]]$ is connected to the end of a real data stream $[[A]]$ to obtain an array $[[A']]=[[A]]||[[A_d]]$ with a length of n+BZ.

A' at this point is, for example, an array (an array of n+BZ items of data) such as A'=((11, 0), (101, 0), \ldots, (3, 0), (dummy, 1), (dummy, 1), \ldots, (dummy, 1)).

<S105>

In S105, the server 100 first respectively sorts the data array and the storage destination data array based on the first address value $addr^0_i$ and the flag $e_i$. In other words, $[[A']] \leftarrow$ Sort $[[ADDR' \cdot pos_0]], [[A']])$ and $[[ADDR']] \leftarrow$ Sort $([[ADDR' \cdot pos_0]], [[ADDR']])$ are computed.

At this point, although the data array and the storage destination data array are to be rearranged in ascending order of address values and, with respect to a same address value, in an order of real data>dummy data, the sorting order can be changed by adjusting ascending order/descending order of subsequent sorting and ranking.

A' after the sort is an array (an array of n+BZ items of data) such as A'=((3, 0), (dummy, 1), (dummy, 1), \ldots, (11, 0), (dummy, 1), \ldots,).

<S106>

In S106, the server 100 performs ranking based on the sorted address values. In other words, the server 100 computes $[[ADDR' \cdot rank_0]] \leftarrow Rank ([[ADDR' \cdot addr_0]])$.

ADDR'·rank_0 is, for example, an array (an array of n+BZ items of data) such as ADDR'·rank0=(1, 2, 3, 4, \ldots, 1, 2, 3, \ldots, 1, 2, 3, 4, 5).

<S107>

In S107, the server 100 sorts the data array and the storage destination data array in descending order based on the first rank. In other words, $[[A']] \leftarrow$ Sort $([[ADDR'\cdot rank_0]], [[A']])$ and $[[ADDR']] \leftarrow$ Sort $([[ADDR'\cdot rank_0]], [[ADDR']])$ are computed to be sorted in descending order of $rank^0_i$. This operation can be similarly implemented by simply sorting the respective arrays in ascending order and then rearranging the arrays in the reverse order.

<S108>

In S108, the server 100 performs sorting based on the second address value $addr'_i$ and the flag in a similar manner to the processing in S105. In other words, the server 100 computes $[[A']] \leftarrow$ Sort $([[ADDR'\cdot pos_1]], [[A']])$ and $[[ADDR']] \leftarrow$ Sort $([[ADDR'\cdot pos_1]], [[ADDR']])$. At this point, using a stable sort enables sorting to be implemented in the orders of real data>dummy data and high rank>low rank with respect to a same address value.

<S109>

In S109, the server 100 performs ranking based on the second sorted address value in a similar manner to the processing in S106. In other words, the server 100 computes $[[ADDR'\cdot rank_1]] \leftarrow$ Rank $([[ADDR'\cdot addr_1]])$.

<S110>

In S110, with respect to each element $[[b_i]]=([[addr^0_i]], [[addr^1_i]], [[e_i]], [[rank^0_i]], [[rank^1_i]])$ of the storage destination data array $[[ADDR']]$, the server 100 extracts an address value of a lower rank. In other words, based on a magnitude comparison $[[z_i]] \leftarrow [[[rank^0_i]] \leq_? [[rank^1_i]]]$, the server 100 computes $[[addr_i]] \leftarrow [[addr^1_i]] + [[z_i]] \times ([[addr^0_i]] \leftarrow [[addr^1_i]])$. Thereafter, an array $[[ADDR^{fin}]]=(([[addr_0]], [[e_0]]), \ldots, ([[addr_{n+BZ-1}]], [[e_{n+BZ-1}]]))$ integrating the selected address value and the flag is computed.

<S111>

In S111, the server 100 sorts each item of data in ascending order based on the newly obtained array $[[ADDR^{fin}]]$. In other words, the server 100 computes $[[A']] \leftarrow$ Sort $([[ADDR^{fin}]], [[A']])$ and $[[ADDR^{fin}]]$ Sort $([[ADDR^{fin}]], [[ADDR^{fin}]])$.

<S112>

In S112, the server 100 computes a rank array $[[R]]=$Rank $([[ADDR^{fin}\cdot addr]])$ using an array $[[ADDR^{fin}\cdot addr]]$ created by only extracting an address value portion of $[[ADDR^{fin}]]$, and further obtains an array $[[Y]]=([[y_0]], \ldots, [[y_{n+BZ-1}]])$ as a result of computing a magnitude comparison $[[y_i]] \leftarrow [[[r_i]] \leq_? Z]$ with respect to each element $[[r_i]]$ of $[[R]]$. At this point, it is shown that data of $y_i=1$ is to be stored in the table while data of $y_i=0$ is to be deleted.

<S113>

In S113, the server 100 sorts the data array in ascending order using $[[Y]]$. In other words, the server 100 computes $[[A']] \leftarrow$ Sort $([[Y]], [[A']])$. Subsequently, only BZ elements at the end are outputted as a hash table and other elements are deleted. Two private keys $[[s_0]]$ and $[[s_1]]$ are also output as access information to accompany the hash table.

In the present first example, if $[[k_i]]$ has O(log N) bits and BZ=O(n) is satisfied, then an amount of inter-server communication is O(n log²n) bits due to sorting, ranking, and comparing.

Second Example

Next, a second example will be described. The present second example shows a more efficient method of constructing a table equivalent to that of the first example. In the first example, due to a data array $[[A]]$ (or $[[A']]$) being always sorted together with a storage destination data array, in addition to simply increasing the number of executions of sorting, there is a possibility of a decline in efficiency due to sorting a data array when large data vi is added to a key and a flag.

Figure 5:
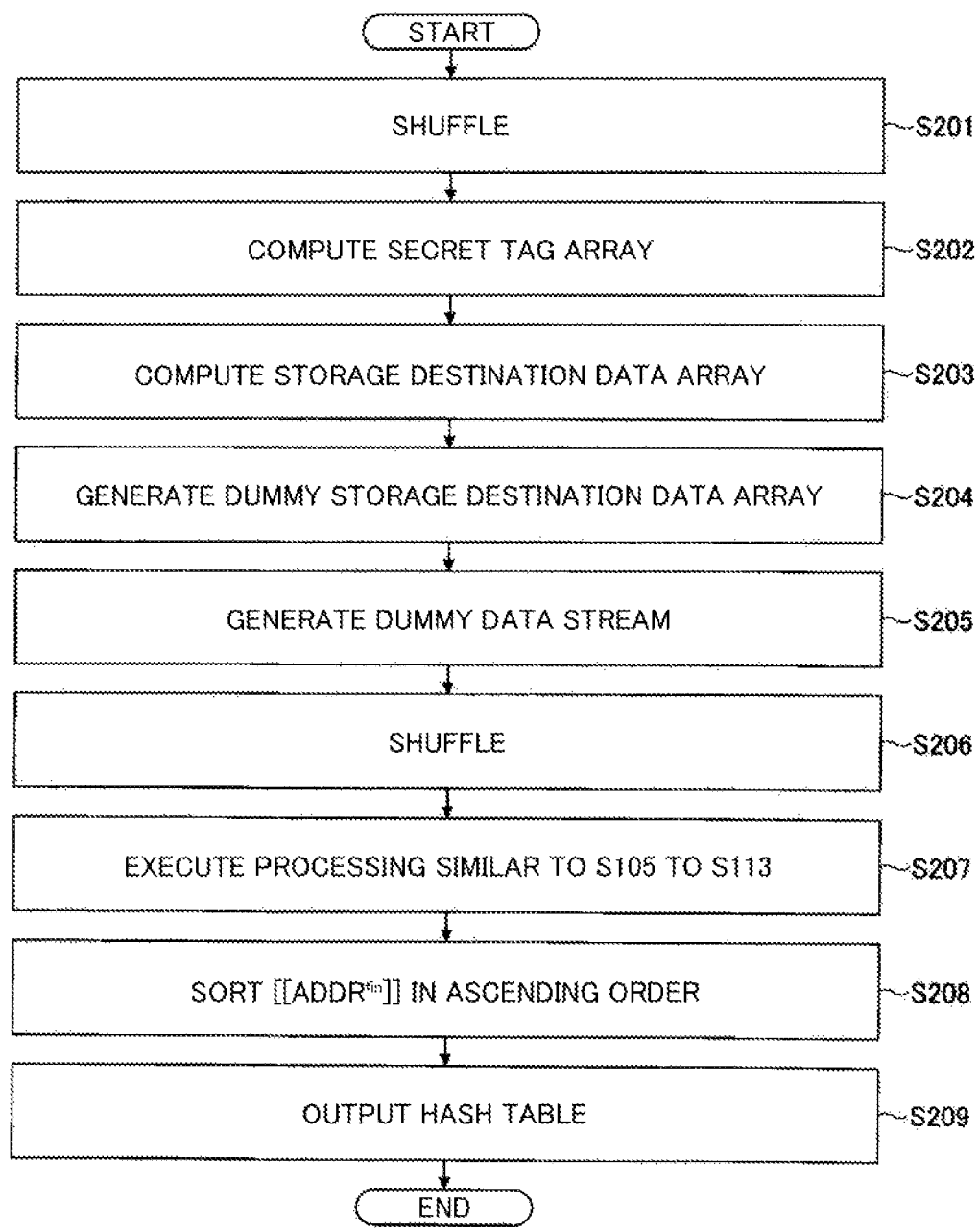
FIG. 5 is a flowchart showing a processing procedure according to a second example.

While the present second example follows the algorithm of the first example in principle, the present second example uses encryption in secret computation to reduce the number of executions of sorting and constructs a secret hash table as follows. Hereinafter, a description will be provided following the procedures shown in the flow chart of FIG. 5.

<S201>

In S201, the server 100 performs shuffling with respect to $[[A]]$ in a similar manner to S101 in the first example so that $[[A]] \leftarrow$ Shuffle $([[A]])$. However, this operation does not need to be executed depending on a state of $[[A]]$ to be an input and safety to be satisfied.

<S202>

In S202, the server 100 generates a private key $[[s]]$ of a concealed block cipher and computes a secret tag array $[[Tag]]=([[tag_0]], \ldots, [[tag_{n-1}]]); [[tag_i]] \leftarrow$ Enc$([[i]], [[s]])$ that corresponds to $[[A]]$. Note that the private key $[[s]]$ can also be generated before start of the protocol.

<S203>

In S203, the server 100 computes a storage destination data array $[[ADDR]]=(([[addr^0_0]], [[addr^1_0]], [[e_0]], [[rank^0_0]], [[rank^1_0]], [[tag_0]]), \ldots, ([[addr^0_{n-1}]], [[addr^1_{n-1}]], [[e_{n-1}]], [[rank^0_{n-1}]], [[rank^1_{n-1}]], [[tag_{n-1}]]))$ in a similar manner to S102 in the first example. The only difference from the first example is inclusion of the tag $[[tag]]$.

<S204>

In S204, the server 100 generates a dummy storage destination data array $[[ADDR_d]]=([[d_0]], \ldots, [[d_{BZ-1}]])$; $d_i=(\text{floor}(i/Z), \text{floor}(i/Z), [[1]], [[0]], [[0]], [[tag^d_i]])$ in a similar manner to S103 in the first example to obtain $[[ADDR']]=[[ADDR]]\|[[ADDR_d]]$, where $[[tag^d_i]] \leftarrow$ PRF $([[n+i]], [[s]])$.

<S205>

In S205, the server 100 generates a dummy data stream $[[A_d]]=([[a^d_0]], \ldots, [[a^d_{BZ-1}]]); a^d_i=(\text{dummy}, 1)$ in a similar manner to S104 in the first example to obtain $[[A']]=[[A]]\|[[A_d]]$. In addition, using the tag array $[[Tag_d]]=([[tag^d_0]], \ldots, [[tag^d_{BZ-1}]])$ computed in S204 in the present second example, $[[Tag']] \leftarrow [[Tag]]\|[[Tag_d]]$ is set.

<S206>

In S206, in order to conceal and randomize an arrangement order of the arrays $[[A']]$ and $[[Tag']]$, the server 100 computes $([[A']], [[Tag']]) \leftarrow$ Shuffle $([[A']], [[Tag']])$. In this operation, the same shuffle processing is executed in parallel in order to randomize the two arrays while maintaining a correspondence relation between the two arrays.

<S207>

In S207, the server 100 performs processing steps similar to those in S105 to S113 in the first example. However, in the second example, the array $[[A']]$ is left untouched and only the storage destination data array is operated in the respective procedures corresponding to S105 to S112 in the first example, and when obtaining a new storage destination data array in the procedure corresponding to S110 in the first example, tag information is carried over by regarding each element of $[[ADDR^{fin}]]$ as $([[addr_i]], [[e_i]], [[tag_i]])$.

<S208>

In S208, the server 100 sorts $[[ADDR^{fin}]]$ in ascending order using $[[Y]]$ obtained in a procedure corresponding to S112 in the first example. In other words, the server 100 computes $[[ADDR^{fin}]] \leftarrow$ Sort $([[Y]], [[ADDR^{fin}]])$. Subsequently, only BZ elements at the end are retained and the other elements are deleted.

<S209>

In S209, the server 100 restores all the elements of the tag array $[[\text{Tag}']]$ and returns the elements to plain text. At the same time, all the tags included in $[[\text{ADDR}^{fin}]]$ are restored and returned to plain text. From the data array $[[\text{A}']]$, BZ elements of which corresponding tags are included in $[[\text{ADDR}^{fin}]]$ are extracted and arranged in an arrangement order of $[[\text{ADDR}^{fin}]]$ to form a hash table. Finally, the hash table and the private keys $[[s_0]]$, $[[s_1]]$ are output.

In the present second example, if $[[k_i]]$ has $O(\log n)$ bits and $BZ=O(n)$ is satisfied, then an amount of inter-server communication is $O(n \log^2 n)$ bits due to sorting, ranking, and comparing. Compared to an amount of inter-server communication becoming $\omega(n \log^2 n)$ bits when a data size of a set $(k_i, e_i, v_i)$ including any data $v_i$ is $\omega(\log n)$ bits in the first example, the present example has an advantage that $O(n \log^2 n)$ bits will suffice regardless of the size of $v_i$.

Third Example

Figure 6:
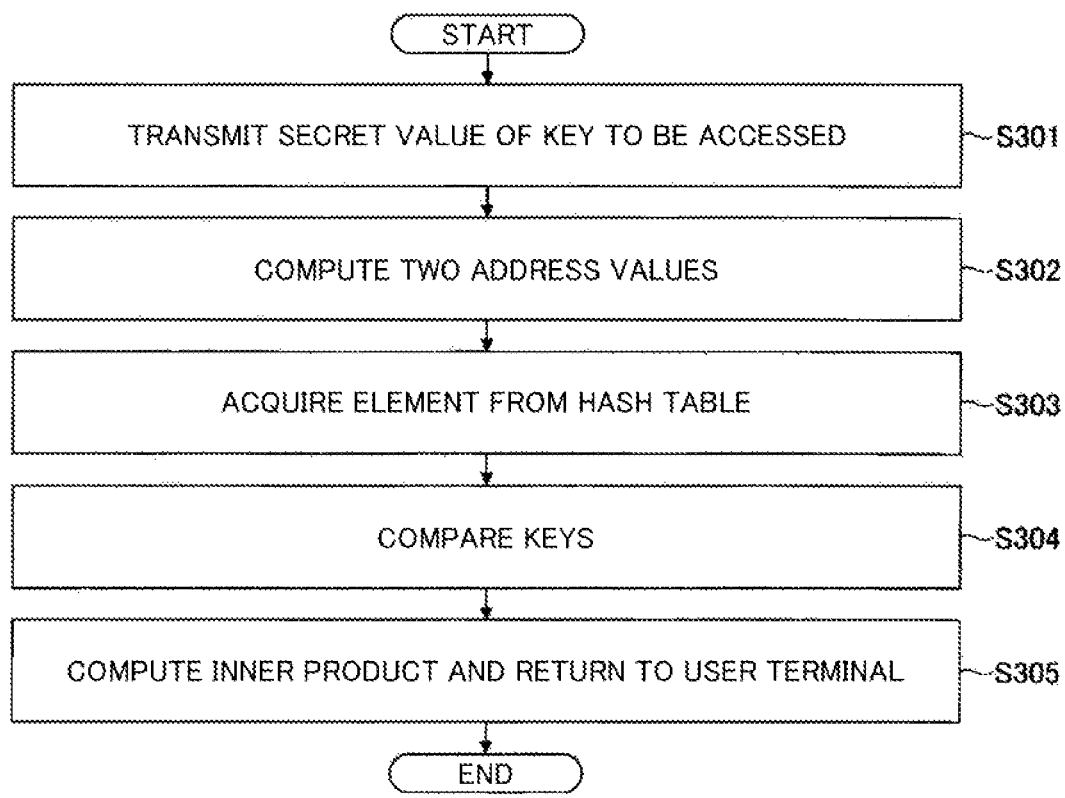
FIG. 6 is a flowchart showing a processing procedure according to a third example.

Next, a third example will be described. In the third example, a data reference method to the secret hash tables constructed in the first and second examples will be described. As a premise, the server 100 is assumed to store, in the data storage unit 140, the secret hash table (size: B×Z) and the private keys $[[s_0]]$, $[[s_1]]$ constructed in the first or second example. In addition, although the user terminal 300 is assumed to have a key k to be accessed, the key k may be selected by the server itself based on an agreement between servers. Hereinafter, a description will be provided following the procedures shown in the flow chart of FIG. 6.

<S301>

In S301, the user terminal 300 sends a secret value $[[k]]$ of a key corresponding to data to be accessed to the server 100. However, besides making a request to the server 100 from the user terminal 300, the secret key value can be generated by the server itself based on an agreement between servers.

<S302>

In S302, the server 100 computes two address values $[[\text{addr}_i]] \leftarrow \text{PRF}([[k]], [[s_0]])$ and $[[\text{addr}^1]] \leftarrow \text{PRF}([[k]], [[s_1]])$ using a pseudo-random function, and restores the address values to obtain $\text{addr}^0$ and $\text{addr}^1$.

<S303>

In S303, the server 100 extracts 2Z elements corresponding to $\text{addr}^0$ and $\text{addr}^1$ from a hash table stored in a data storage unit 140. In other words, when the hash table is replaced with an array $[[\text{Table}]]=([[a_0]], \ldots, [[a_{BZ-z}]])$, then $[[a]]=([[a_{Z \times addr0}]], \ldots, [[a_{Z \times addr0+Z-1}]], [[a_{Z \times addr1}]], \ldots, [[a_{Z \times add1+Z-1}]])$ is acquired.

<S304>

In S304, with respect to each item of data $[[a_j]]$ in $[[a]]$, the server 100 compares keys and computes $[[c]]=([[c_0]], \ldots, [[c_{2Z-1}]])$; $[[c_j]]=[[[k_j]]=?[[k]]]$.

<S305>

In S305, the server 100 computes an inner product $[[a]] \leftarrow <[[a]], [[c]]>$ and either returns the inner product to the user terminal 300 or restores the inner product based on an agreement between servers. Alternatively, the inner product may not be restored and may be used for completely different secret computation processing.

In the present third example, a communication amount between the user and the server is $O(\log n)$ bits and an amount of inter-server communication is $O(Z \log n)$ bits.

Fourth Example

Figure 7:
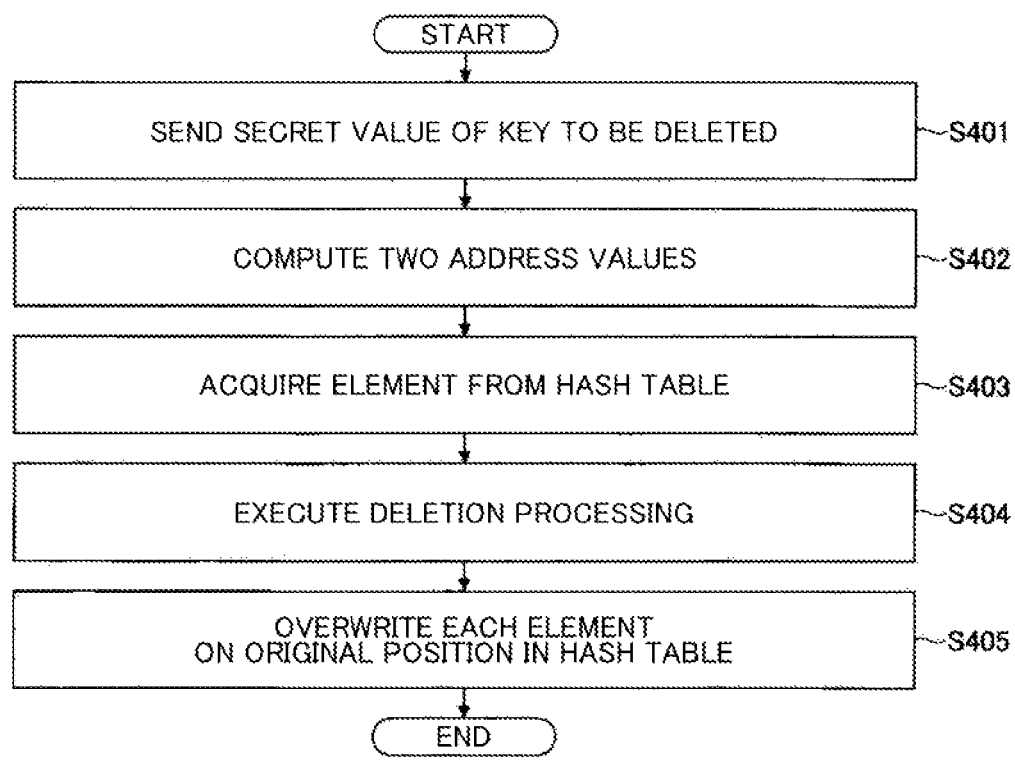
FIG. 7 is a flowchart showing a processing procedure according to a fourth example.

In the present fourth example, a method of deleting data in the secret hash tables constructed in the first and second examples will be described. As a premise, the server 100 is assumed to store, in the data storage unit 140, the secret hash table (size: B×Z) and the private keys $[[s_0]]$, $[[s_1]]$ constructed in the first or second example. In addition, although the user is assumed to have a key k of data to be deleted, the key k may be selected by the server itself based on an agreement between servers. Hereinafter, a description will be provided following the procedures shown in the flow chart of FIG. 7.

<S401>

In S401, the user terminal 300 sends a secret value $[[k]]$ of a key to be deleted to the server 100. However, besides making a request to the server 100 from the user terminal 300, the secret key value can be generated by the server itself based on an agreement between servers.

<S402>

In S402, the server 100 computes two address values $[[\text{addr}^0]] \leftarrow \text{PRF}([[k]], [[s_0]])$ and $[[\text{addr}^1]] \leftarrow \text{PRF}([[k]], [[s_1]])$ using a pseudo-random function, and restores the address values to obtain $\text{addr}^0$ and $\text{addr}^1$.

<S403>

In S403, the server 100 extracts 2Z elements corresponding to $\text{addr}^0$ and $\text{addr}^1$ from a hash table stored in the data storage unit 140. In other words, when the hash table is replaced with an array $[[\text{Table}]]=([[a_0]], \ldots, [[a_{BZ-1}]])$, then $[[a]]=([[a_{Z \times addr0}]], \ldots, [[a_{Z \times addr0+Z-1}]], [[a_{Z \times addr1}]], \ldots, [[a_{Z \times addr1+Z-1}]])$ is acquired.

<S404>

In S404, with respect to each item of data $[[a_j]]$ of $[[a]]$, the server 100 performs deletion processing of data $([[k]], [[e]])$ based on a comparison of keys. In other words, with respect to all j, $[[k_j]]=[[k_j]]+[[[k_j]]=?[[k]]]\times(\text{dummy}-[[k_j]])$, $[[e_j]]=[[e_j]]+[[[k_j]]=?[[k]]]$ is computed.

<S405>

Finally, the server 100 overwrites the respective elements of $[[a]]$ at original positions in the hash table. Communication amounts in the present fourth example are equivalent to those in the third example.

Fifth Example

Figure 8:
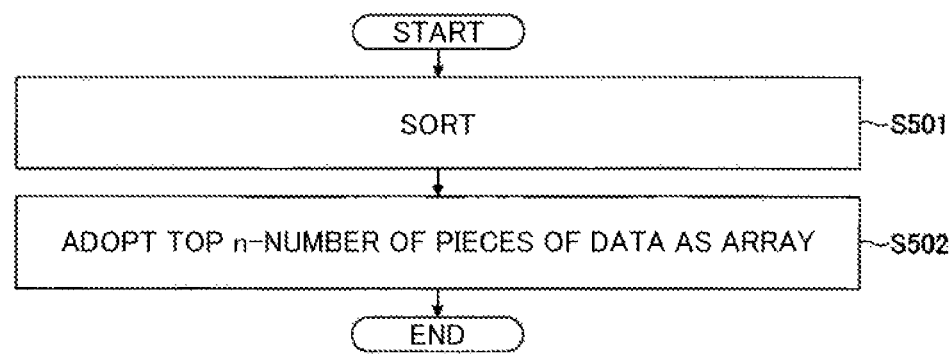
FIG. 8 is a flowchart showing a processing procedure according to a fifth example.

In the present fifth example, a method of disassembling the hash table constructed in the first and second examples and a method of extracting all data items will be described. As a premise, the server 100 is assumed to store, in the data storage unit 140, the secret hash table (size: B×Z) constructed in the first or second example. Hereinafter, a description will be provided following the procedures shown in the flow chart of FIG. 8.

<S501>

In S501, the server 100 sorts all data items of the hash table in ascending order based on flags thereof. In other words, when the table is replaced with an array $[[\text{Table}]]=([[a_0]], \ldots, [[a_{BZ-1}]])$ and an array obtained by extracting only flags from the table is $[[E]]=([[e_0]], \ldots, [[e_{BZ-1}]])$, then $[[\text{Table}]]=\text{Sort}([[E]], [[\text{Table}]])$ is created.

<S502>

In S502, the server 100 adopts top n-items of data of $[[\text{Table}]]$ as an array $[[\text{A}]]$ and deletes remaining data.

In the present example, since sorting based on 1-bit information is performed only once, an amount of inter-server communication is $O(n \log n)$.

Effects of Embodiment

According to the present embodiment, using secret computation enables a secret hash table to be constructed without communication with a user. In doing so, by using secret computation processing of ranking the number of executions of secret sorting to be performed in order to construct a table, can be significantly reduced, and the communication cost to can be significantly reduced as compared with conventional methods.

Specifically, by allocating two kinds of address values to each item of data when constructing a secret hash table, an amount of inter-server communication can be reduced from $j(n \log^{2.5} n)$ to $O(n \log^2 n)$ while retaining an advantage of a conventional method of a reduced table size. Operations can also be performed on a constructed table.

(Supplementary Items)

The present specification discloses at least a secret hash table construction apparatus, a secret hash table construction system, a secret hash table construction method, and a program according to each of the following supplementary items.

(Item 1)

A secret hash table construction apparatus for constructing a secret hash table capable of storing up to a maximum of Z items of data in each of B kinds of address values by secret computation from a real data stream including a plurality of items of data each having a key and a flag indicating whether or not the data is dummy data, the secret hash table construction apparatus including a computing unit which:

generates a first array in which a storage destination data array including a first address value and a second address value, a flag, and a rank for each address value with respect to each item of data of the real data stream is connected with a storage destination data array including a first address value and a second address value, a flag, and a rank for each address value as dummy data;

generates a second array in which the real data stream is connected with a dummy data stream;

sorts each of the first array and the second array based on the first address value and the flag in the first array, performs a ranking operation on a same item of data with respect to the first address value of the sorted first array, and sorts each of the first array and the second array based on the ranking;

sorts each of the first array and the second array based on the second address value and the flag in the first array and performs a ranking operation on a same item of data with respect to the second address value of the sorted first array; extracts an address value of a lower rank among the first address value and the second address value in the first array, and generates a third array including the extracted address value and a flag; and sorts the second array using a fourth array obtained by comparing each element of a rank array computed from an address value in the third array with Z, and outputs BZ elements in the sorted second array as the secret hash table.

(Item 2)

The secret hash table construction apparatus according to item 1, wherein the computing unit generates the secret hash table without performing sorting other than sorting based on the fourth array with respect to the second array in which the real data array is connected with the dummy data array by using a tag array including tags each indicating each item of data in the real data array and each item of data in the dummy data array.

(Item 3)

The secret hash table construction apparatus according to item 1 or 2, wherein the computing unit computes two address values from a key value of an access object, acquires 2Z items of data corresponding to the two address values from the secret hash table, and returns data having a same key value as the key value among the 2Z items of data.

(Item 4)

The secret hash table construction apparatus according to any one of items 1 to 3, wherein the computing unit computes two address values from a key value to be deleted, acquires 2Z items of data corresponding to the two address values from the secret hash table, and deletes data having a same key value as the key value among the 2Z items of data.

(Item 5)

The secret hash table construction apparatus according to any one of items 1 to 4, wherein the computing unit sorts all data items in the secret hash table based on flags of the data, and acquires a predetermined number of items of data at top of the secret hash table as the real data stream.

(Item 6)

A secret hash table construction system for constructing a secret hash table capable of storing up to a maximum of Z items of data in each of B kinds of address values by secret computation from a real data stream including a plurality of items of data each having a key and a flag indicating whether or not the data is dummy data, the secret hash table construction system including a computing unit which:

generates a first array in which a storage destination data array including a first address value and a second address value, a flag, and a rank for each address value with respect to each item of data of the real data stream is connected with a storage destination data array including a first address value and a second address value, a flag, and a rank for each address value as dummy data;

generates a second array in which the real data stream is connected with a dummy data stream;

sorts each of the first array and the second array based on the first address value and the flag in the first array, performs a ranking operation on a same item of data with respect to the first address value of the sorted first array, and sorts each of the first array and the second array based on the ranking;

sorts each of the first array and the second array based on the second address value and the flag in the first array and performs a ranking operation on a same item of data with respect to the second address value of the sorted first array; extracts an address value of a lower rank among the first address value and the second address value in the first array, and generates a third array including the extracted address value and a flag; and sorts the second array using a fourth array obtained by comparing each element of a rank array computed from an address value in the third array with Z, and outputs BZ elements in the sorted second array as the secret hash table.

(Item 7)

A secret hash table construction method executed by a secret hash table construction system for constructing a secret hash table capable of storing up to a maximum of Z items of data in each of B kinds of address values by secret computation from a real data stream including a plurality of items of data each having a key and a flag indicating whether or not the data is dummy data, the secret hash table construction method including the steps of:

generating a first array in which a storage destination data array including a first address value and a second address value, a flag, and a rank for each address value with respect to each item of data of the real data stream is connected with a storage destination data array including a first address value and a second address value, a flag, and a rank for each address value as dummy data;

generating a second array in which the real data stream is connected with a dummy data stream;

sorting each of the first array and the second array based on the first address value and the flag in the first array, performing a ranking operation on a same item of data with respect to the first address value of the sorted first array, and sorting each of the first array and the second array based on the ranking;

sorting each of the first array and the second array based on the second address value and the flag in the first array and performing a ranking operation on a same item of data with respect to the second address value of the sorted first array; extracting an address value of a lower rank among the first address value and the second address value in the first array, and generating a third array including the extracted address value and a flag; and sorting the second array using a fourth array obtained by comparing each element of a rank array computed from an address value in the third array with Z, and outputting BZ elements in the sorted second array as the secret hash table.

(Item 8)

A program causing a computer to function as the computing unit of the secret hash table construction apparatus according to any one of items 1 to 5.

While the present embodiment has been described above, it is to be understood that the present invention is not limited to the specific embodiment and that various modifications and changes can be made within the scope of the gist of the present invention described in the claims.

REFERENCES

[1] T-H. H. Chan, Y. Guo, W-K. Lin, and E. Shi. Oblivious hashing revisited, and applications to asymptotically efficient ORAM and OPRAM. Cryptology ePrint Archive, Report 2017/924, 2017.

[2] K. Chida, K. Hamada, D. Ikarashi, R. Kikuchi, and B. Pinkas. High-throughput secure AES computation. In WAHC@CCS 2018, pages 13-24, 2018.

[3] K. Chida, K. Hamada, D. Ikarashi, R. Kikuchi, N. Kiribuchi, B. Pinkas. An efficient secure threeparty sorting protocol with an honest majority. CryptologyePrint Archive, Report 2019/695 (2019), https://eprint.iacr.org/2019/695

[4] O. Goldreich and R. Ostrovsky. Software protection and simulation on oblivious RAMs. J. ACM, 43(3):431-473, May 1996.8

[5] M. Ito, A. Saito, and T. Nishizeki. Secret sharing schemes realizing general access structures. Proceedings of the IEEE Global Telecommunication Conference, Globecom 87, pp. 99-102, 1987.

[6] A. Shamir. How to share a secret. Commun. ACM, Vol. 22, No. 11, pp. 612-613, 1979.

[7] Naoto Kiribuchi, Dai Ikarashi, Koki Hamada, and Ryo Kikuchi: "MEVAL3: A Library for Programmable Secure Computation," Symposium on Cryptography and Information Security (SCIS), 2018.

REFERENCE SIGNS LIST

100 Server
110 Input unit
120 Computing unit
130 Output unit
140 Data storage unit
200 Communication network
300 User terminal
1000 Drive apparatus
1001 Recording medium
1002 Auxiliary storage apparatus
1003 Memory apparatus
1004 CPU
1005 Interface apparatus
1006 Display apparatus
1007 Input apparatus

The invention claimed is:

1. A secret hash table construction apparatus for constructing a secret hash table capable of storing up to a maximum of Z items of data in each of B kinds of address values by secret computation from a real data stream including a plurality of items of data each having a key and a flag indicating whether or not the data is dummy data, the secret hash table construction apparatus comprising:

a memory; and a processor configured to execute generating a first array in which a storage destination data array including a first address value and a second address value, a flag, and a rank for each address value with respect to each item of data of the real data stream is connected with a storage destination data array including a first address value and a second address value, a flag, and a rank for each address value as dummy data;

generating a second array in which the real data stream is connected with a dummy data stream;

sorting each of the first array and the second array based on the first address value and the flag in the first array, performing a ranking operation on a same item of data with respect to the first address value of the sorted first array, and sorting each of the first array and the second array based on the ranking;

sorting each of the first array and the second array based on the second address value and the flag in the first array and performing a ranking operation on a same item of data with respect to the second address value of the sorted first array;

extracting an address value of a lower rank among the first address value and the second address value in the first array, and generating a third array including the extracted address value and a flag; and sorting the second array using a fourth array obtained by comparing each element of a rank array computed from an address value in the third array with Z, and outputting B*Z elements in the sorted second array as the secret hash table.

2. The secret hash table construction apparatus according to claim 1, wherein the processor generates the secret hash table without performing sorting other than sorting based on the fourth array with respect to the second array in which the real data array is connected with the dummy data array by using a tag array including tags each indicating each item of data in the real data array and each item of data in the dummy data array.

3. The secret hash table construction apparatus according to claim 1, wherein the processor computes two address values from a key value of an access object, acquires 2Z items of data corresponding to the two address values from the secret hash table, and returns data having a same key value as the key value among the 2Z items of data.

4. The secret hash table construction apparatus according to claim 1, wherein the processor computes two address values from a key value to be deleted, acquires 2Z items of data corresponding to the two address values from the secret hash table, and deletes data having a same key value as the key value among the 2Z items of data.

5. The secret hash table construction apparatus according to claim 1, wherein the processor sorts all data items in the secret hash table based on flags of the data, and acquires a predetermined number of items of data at top of the secret hash table as the real data stream.

6. A secret hash table construction system for constructing a secret hash table capable of storing up to a maximum of Z items of data in each of B kinds of address values by secret computation from a real data stream including a plurality of items of data each having a key and a flag indicating whether or not the data is dummy data, the secret hash table construction system comprising a computing unit which:
generating a first array in which a storage destination data array including a first address value and a second address value, a flag, and a rank for each address value with respect to each item of data of the real data stream is connected with a storage destination data array including a first address value and a second address value, a flag, and a rank for each address value as dummy data;
generating a second array in which the real data stream is connected with a dummy data stream;
sorting each of the first array and the second array based on the first address value and the flag in the first array, performing a ranking operation on a same item of data with respect to the first address value of the sorted first array, and sorting each of the first array and the second array based on the ranking;
sorting each of the first array and the second array based on the second address value and the flag in the first array and performing a ranking operation on a same item of data with respect to the second address value of the sorted first array;
extracting an address value of a lower rank among the first address value and the second address value in the first array, and generating a third array including the extracted address value and a flag; and
sorting the second array using a fourth array obtained by comparing each element of a rank array computed from an address value in the third array with Z, and outputting B*Z elements in the sorted second array as the secret hash table.

7. A secret hash table construction method executed by a secret hash table construction system for constructing a secret hash table capable of storing up to a maximum of Z items of data in each of B kinds of address values by secret computation from a real data stream including a plurality of items of data each having a key and a flag indicating whether or not the data is dummy data, the secret hash table construction method comprising:
generating a first array in which a storage destination data array including a first address value and a second address value, a flag, and a rank for each address value with respect to each item of data of the real data stream is connected with a storage destination data array including a first address value and a second address value, a flag, and a rank for each address value as dummy data;
generating a second array in which the real data stream is connected with a dummy data stream;
sorting each of the first array and the second array based on the first address value and the flag in the first array, performing a ranking operation on a same item of data with respect to the first address value of the sorted first array, and sorting each of the first array and the second array based on the ranking;
sorting each of the first array and the second array based on the second address value and the flag in the first array and performing a ranking operation on a same item of data with respect to the second address value of the sorted first array;
extracting an address value of a lower rank among the first address value and the second address value in the first array, and generating a third array including the extracted address value and a flag; and
sorting the second array using a fourth array obtained by comparing each element of a rank array computed from an address value in the third array with Z, and outputting B*Z elements in the sorted second array as the secret hash table.

8. A non-transitory computer-readable recording medium having computer-readable instructions stored thereon, which when executed, cause a computer to perform a secret hash table construction method executed by a secret hash table construction system for constructing a secret hash table capable of storing up to a maximum of Z items of data in each of B kinds of address values by secret computation from a real data stream including a plurality of items of data each having a key and a flag indicating whether or not the data is dummy data, the secret hash table construction method comprising:
generating a first array in which a storage destination data array including a first address value and a second address value, a flag, and a rank for each address value with respect to each item of data of the real data stream is connected with a storage destination data array including a first address value and a second address value, a flag, and a rank for each address value as dummy data;
generating a second array in which the real data stream is connected with a dummy data stream;
sorting each of the first array and the second array based on the first address value and the flag in the first array, performing a ranking operation on a same item of data with respect to the first address value of the sorted first array, and sorting each of the first array and the second array based on the ranking;
sorting each of the first array and the second array based on the second address value and the flag in the first array and performing a ranking operation on a same item of data with respect to the second address value of the sorted first array;
extracting an address value of a lower rank among the first address value and the second address value in the first array, and generating a third array including the extracted address value and a flag; and
sorting the second array using a fourth array obtained by comparing each element of a rank array computed from an address value in the third array with Z, and outputting B*Z elements in the sorted second array as the secret hash table.

\* \* \* \* \*